Jan. 27, 1931. P. J. SAVAGE 1,790,328
VISOR
Filed Dec. 7, 1929
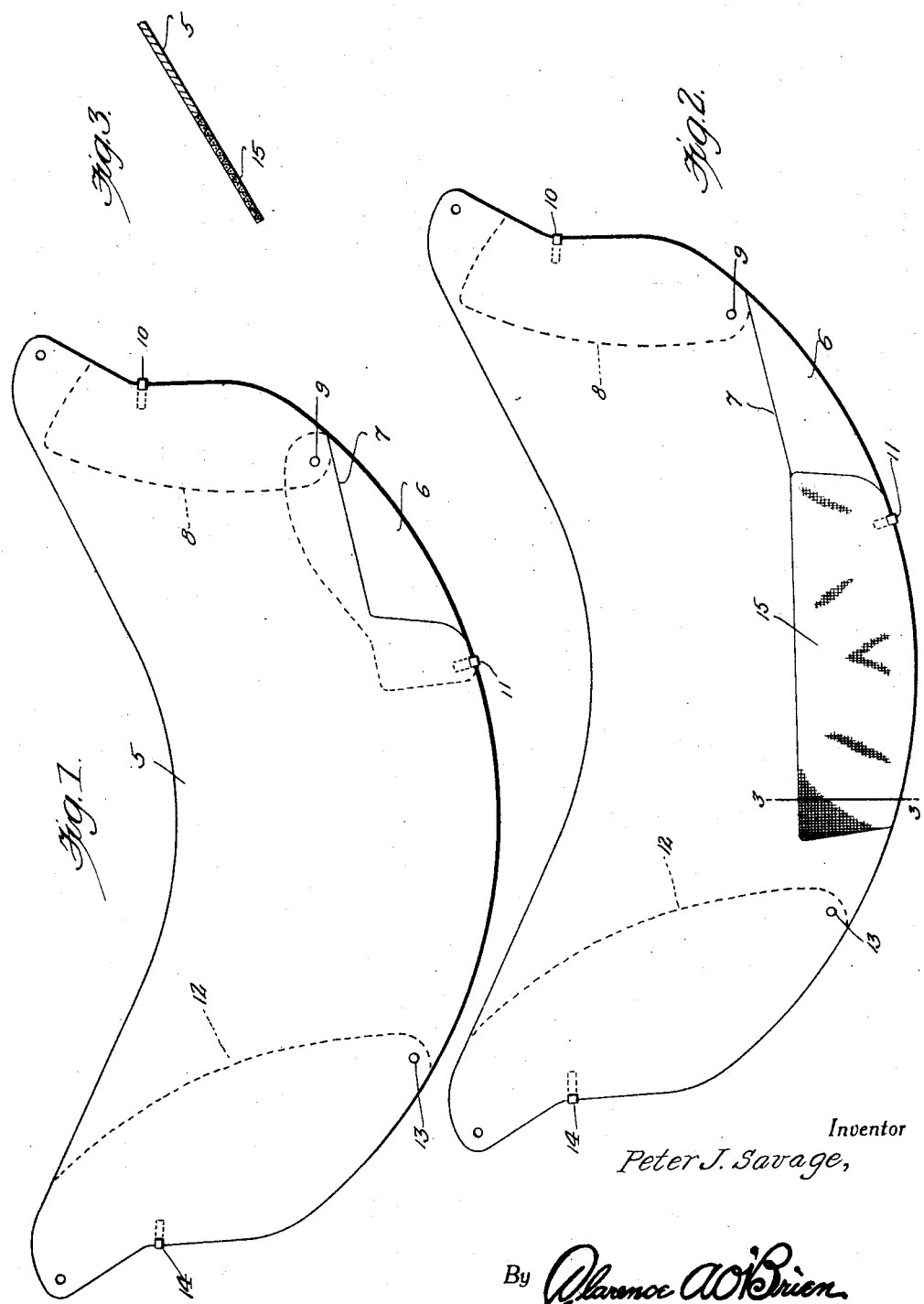
Inventor
*Peter J. Savage,*
By *Clarence A. O'Brien*
Attorney Patented Jan. 27, 1931

1,790,328

UNITED STATES PATENT OFFICE

PETER J. SAVAGE, OF IRON RIVER, WISCONSIN

VISOR

Application filed December 7, 1929. Serial No. 412,449.

This invention relates to a driving visor, for use in operating an automobile and the present invention has particular reference to certain new and useful improvements in a visor of this character and such as forms the subject matter of my co-pending application Serial No. 387,696, filed under date of August 22, 1929.

With the above and numerous other objects in view as will become apparent during a study of the following description, taken in connection with the accompanying drawings, the invention consists in certain new and novel arrangement and combination of parts as disclosed in the drawings, and hereinafter described somewhat in detail.

In the drawings:—

Figure 1 is a top plan view of a visor constructed in accordance with the present invention, and illustrating one embodiment of the invention.

Figure 2 is a similar view of a modified form of the invention.

Figure 3 is a detail sectional view taken substantially on the line 3—3 of Figure 2.

With reference more in detail to the drawing it will be seen that my improved visor comprises a body portion designated generally by the reference character 5, and it will be seen that this body portion 5 is of the general configuration designated in Figures 1 and 2, and is intended to be strapped or otherwise fastened upon the head of the wearer. This body portion 5 of the visor may be made of celluloid, smoked glass, or similar semi-transparent material. However, adjacent one end of the visor at the forward edge thereof, said visor is provided with a limited sector indicated as at 6 preferably of a colorless transparent material such as celluloid, mica, glass or the like, or if desired instead of an insert or sector of this character, the said visor may be notched at this point as indicated generally at 7 and the transparent sector 6 dispensed with. Whether the visor be merely notched or provided with this transparent sector, is immaterial since it is apparent that the person wearing the visor, by merely dropping his head slightly may bring the main body portion of the visor between the eyes and the light, but at the same time permitting one eye to have an unobstructed view of all the highway to the right of an approaching car for a distance of one hundred yards or more, as well as that part of the highway which appears in front of the wearer.

A shutter designated generally by the reference character 8 is pivotally secured at one end as at 9 to the visor or main body 5 above the sector 6 and is adapted for swinging movement across the underface of the body for disposition across the sector 6, which sector 6 or the notched out portion 7 may be designated and will be hereinafter referred to generally as the clear vision area of the visor. When the shutter is swung toward the right in Figure 1 for uncovering the clear vision area, the said shutter may be retained in this position through the medium of a spring clip 10 secured to the head of the visor as shown to advantage in Figure 1. When swung to inoperative position, that is to cover the clear vision area, said shutter 8 may be retained in this last mentioned position through the medium of a similar spring clip 11 as also shown to advantage in Figure 1.

The foregoing description has merely been for the purpose of clearly setting forth the use of the visor and the features of construction noted therein are described more or less in detail and embody the subject matter of my said co-pending application, Serial No. 387,696, filed under date of August 22, 1929.

According to the present invention the visor 5 is also equipped with a relatively large or elongated shutter 12 pivoted at one end adjacent the forward edge of the visor at the opposite end of the visor as at 13. This shutter 12 is also adapted for swinging movement either to occupy that position indicated in dotted line in Figure 1 or may be swung about its pivot so that its free end may be received in the clip 11 for retaining said shutter longitudinally of the visor adjacent the forward edge thereof. The shutter 12 is preferably of translucent material and when swung to the last mentioned position, or as may be stated to an effective position will add density to that area of the visor between the eyes and the light rays such as light rays from the sun, thus rendering the sun rays harmless yet at the same time permitting the wearer of the visor to see the exact location of the sun above the earth's horizon. He may obtain a clear view of the highway through the clear-vision section or notch when the sun is so positioned to the left of the highway as it permits such an unobstructed view, and when the sun is directly over the highway, or to the right thereof, then the wearer can so turn his head slightly to the right so that it will bring that portion of the body of the visor to the left of the clear-vision section or notch between the eyes and the direct rays of the sun, this permitting a clear view of the road under the said section of the visor.

The shutter 12 is retained in a position shown in dotted lines in Figure 1 or in an ineffective position through the medium of a spring clip 14.

Attention is now directed to Figure 2 wherein is shown a modified form of the invention. In this form of the invention, the construction is substantially the same in view of the fact that the body of the visor is equipped with the shutter 12 which may be designated as the densifying shutter, the shutter 8, and the clear-vision area controlled by the shutter 8, as is apparent. However, in this form of the invention the body 5 at the forward edge thereof and between the clear vision area of the body and the lower end portion of the shutter 12, said body has arranged therein a substantially elongated insert designated generally by the reference character 15. The insert 15 may be made of a heavy woven wire mesh, the strands of which are woven together so closely as to leave apertures of the approximate size of an ordinary sewing needle, or if desired may be made of any other suitable material either mineral or vegetable of an opaque or somewhat opaque nature and which will contain numerous small apertures, which apertures may be filled with a covering of any suitable clear-vision material, so that by having the apertures filled in with some clear substance through which vision may be had it would tend to prevent dirt gathering and filling or partially filling the minute apertures. However, such covering may or may not be employed as may be desired, and through the medium of such an insert the light rays will be diffused thus shielding or protecting the wearer from the direct rays of the light whether it be from the sun or an approaching vehicle.

Manifestly, in this embodiment of the invention when the shutter 12 is swung to an effective position or across the forward portion of the shade, the said shutter will be positioned across the insert 15 thus closing the apertures of the insert.

In regard to the last referred to embodiment of my invention, I wish it to be understood that I do not wish to limit myself to the provision of the clear-vision area formed by the insert 15, and as is apparent the body portion 5 may be made entirely of a material, preferably fiber, which is opaque or nearly opaque and which contains numerous small apertures or clear-vision part through which a limited vision may be had, instead of the apertures as formed by this insert 15 being restricted to a limited area of the body. In the event that the body portion 5 be perforated as just mentioned, and is opaque or near opaque material, the shutter to the right, that is, the shutter 8 would also be of a like material, and likewise perforated or provided with clear vision sectors similar to the body 5.

Thus from the foregoing, it will be seen that in this embodiment of the invention the visor is equipped with two clear-vision areas as it were, namely, that clear vision area formed either by the notch 7 or the transparent sector 6 and the other clear vision area defined by the body insert 15.

It is also to be understood, that in both embodiments of the invention where I have shown the notch 7 and the sector 6 to be on the left hand end or side of the visor that I do not wish to limit myself to the specific particular location, but it is to be understood that the notch and sector may be on the right hand side or end of the visor as would adapt the visor for use in countries requiring driving to the left instead of the right.

It is believed that from the foregoing description, taken in connection with the accompanying drawings, a clear understanding of the operation and construction, utility and advantages of an automotive visor of this character will be had by those skilled in this art without a more detail description.

Even though I have herein shown and described the preferred embodiments of my invention, it is to be understood that the same is susceptible to changes fully comprehended by the spirit of the invention as herein described and the scope of the appended claims.

Having thus described my invention, what I wish to claim as new is:—

1. As a new product of manufacture, a visor, including essentially a body portion of semi-opaque material, and having a notch formed on one end thereof adjacent the forward edge of the body to provide a clear vision area, a shutter pivotally mounted on said body adjacent said notch for movement into and out of effective position across said notch, and means for retaining said shutter in either of said positions, a light diffusing insert arranged in said body at the forward edge of said body to one side of said notch, and a shutter pivotally secured to said body at that end of said insert remote from said notch, said shutter adapted to be swung to a position across said insert, when the first mentioned shutter is in effective position, and to a position away from said insert when said first mentioned shutter is positioned across said notch, and spring clips carried by said body and engageable with said shutters for retaining said shutters either in effective or ineffective position, respectively.

2. As a new product of manufacture, a visor comprising a body portion of translucent material, said body portion adjacent the forward edge thereof and at one end thereof provided with a notch to provide a clear vision area for said body, and an insert arranged within said body at the forward edge of said body and extending between said notch and the opposite end of said body, shutters movably mounted on said body at opposite ends of the body, said shutters being of different length, one of said shutters adapted to be moved to a position across said insert, and the other of said shutters adapted to be moved across said notch.

In testimony whereof I affix my signature.

PETER J. SAVAGE.